United States Patent [19]
Carr

[11] 4,382,771
[45] May 10, 1983

[54] GAS AND STEAM GENERATOR

[75] Inventor: Charles H. Carr, Tulsa, Okla.

[73] Assignee: Lola Mae Carr, Tulsa, Okla.

[21] Appl. No.: 149,263

[22] Filed: May 12, 1980

[51] Int. Cl.$^3$ .................... F23M 3/04; F23L 17/00
[52] U.S. Cl. .................................... 431/158; 431/10; 60/39.55
[58] Field of Search ........ 431/158, 157, 190, 351–353; 60/39.55, 746, 269

[56] References Cited

U.S. PATENT DOCUMENTS

| | | | |
|---|---|---|---|
| 2,408,111 | 9/1946 | Truax et al. | 431/158 X |
| 3,194,295 | 7/1965 | Marchal et al. | 431/158 X |
| 3,320,999 | 5/1967 | Stalego | 431/158 |
| 3,376,098 | 4/1968 | Pryor | 431/158 X |
| 3,514,956 | 6/1970 | Bray | 60/269 |
| 3,747,336 | 7/1973 | Dibelius et al. | 60/39.55 |
| 3,991,559 | 11/1976 | Oda et al. | 60/39.55 X |
| 4,041,699 | 8/1977 | Schelp | 60/39.55 |

*Primary Examiner*—Larry Jones
*Attorney, Agent, or Firm*—Head, Johnson & Stevenson

[57] ABSTRACT

A gas and steam generator having at least two interconnected combustion chambers wherein water in combination with combustible materials is utilized for creating power for a work operation, each combustion chamber being provided with a reduced nozzle-type outlet for creating great pressures and temperatures within the respective chambers, and each combustion chamber being arranged for receiving combustible materials therein for burning thereof. The initial combustion chamber preferably receives a fuel-oxygen mixture at the inlet end thereof for ignition, with the products of the combustion being maintained at a high pressure and temperature by the restrictive nozzle-type outlet of the chamber. Steam and additional combustible materials are introduced at the nozzle outlet of the chamber for ignition and passage into a next stage combustion chamber whereby additional heat and force is produced for ultimate delivery of great power for a work operation. The water/fuel ratio is relatively high, which results in a reduction of fuel for fuel efficiency in the production of power for the work of operation.

18 Claims, 5 Drawing Figures

GAS AND STEAM GENERATOR

BACKGROUND OF THE INVENTION

1. Field of the Invention

This invention relates to improvements in combustion chambers and a more particularly, but not by way of limitation to a multi-stage combustion chamber for producing gases and super heated steam in combination for creating power in a fuel efficient manner and substantially fuel free manner.

2. Description of the Prior Art

At the present time, oils, such as fossil fuels, are widely used as an energy source to produce gases for use in rocket engine and other aerial propulsion mechanism, and in turboprop and turbojet engines in aircraft, and the like. Natural gases, artificial gases, coals and oils are also being utilized as an energy source for the heating of waters in boilers to produce saturated steam and in superheating boilers to produce dry high temperature super heated steam. These present day methods of producing power have certain disadvantages in that the fuel consumption is frequently high in relation to the power produced, and the burning of the fuels in the usual manner may create pollution in the surrounding atmosphere. In the present day energy crisis and with the current concern with air pollution, these disadvantages are augmented, and any means of reducing fuel consumption while increasing the power output, and alleviating the pollution problem, is of considerable importance.

SUMMARY OF THE INVENTION

The present invention contemplates a novel gas and steam generator which has been particularly designed and constructed for overcoming the foregoing disadvantages and which combines the gases, such as produced for use in rockets, with the super heated steam, as produced by the boilers, to provide a mixture of gases and steam as a power source. Gases, either natural or artificial, coals, oils, magnesium, hydrogen, borax and borons or the combination of one or more may be utilized in the novel device. The novel generator comprises a plurality of combustion chamber assemblies secured in interconnected relationship, with the combustion chamber of each assembly being in communication with the combustion chamber of the preceding and succeeding assemblies through restrictive orifice means. The temperature and velocity of the gases at the restrictive orifices is considerable, and water, steam and combustible materials are introduced simultaneously at the orifices for ignition of the combustible materials and heating of the water to produce saturated or super-heated steam in combination with the gases of combustion as a power source. The high temperatures and pressures maintained within each combustion chamber by the restrictive outlet thereof produces a great burning efficiency for the combustible materials and, in addition, the ratio of water to fuel is relatively high as, for example, 90% water and 10% fuel, thus resulting in the production of high velocity exhaust gases and steam in combination for a power source utilizing a minimum of fuel consumption, and with a minimum of unburned fuel escaping into the atmosphere. The novel apparatus is simple and efficient in operation and economical and durable in construction.

DESCRIPTION OF THE PREFERRED EMBODIMENT

Figure 1:
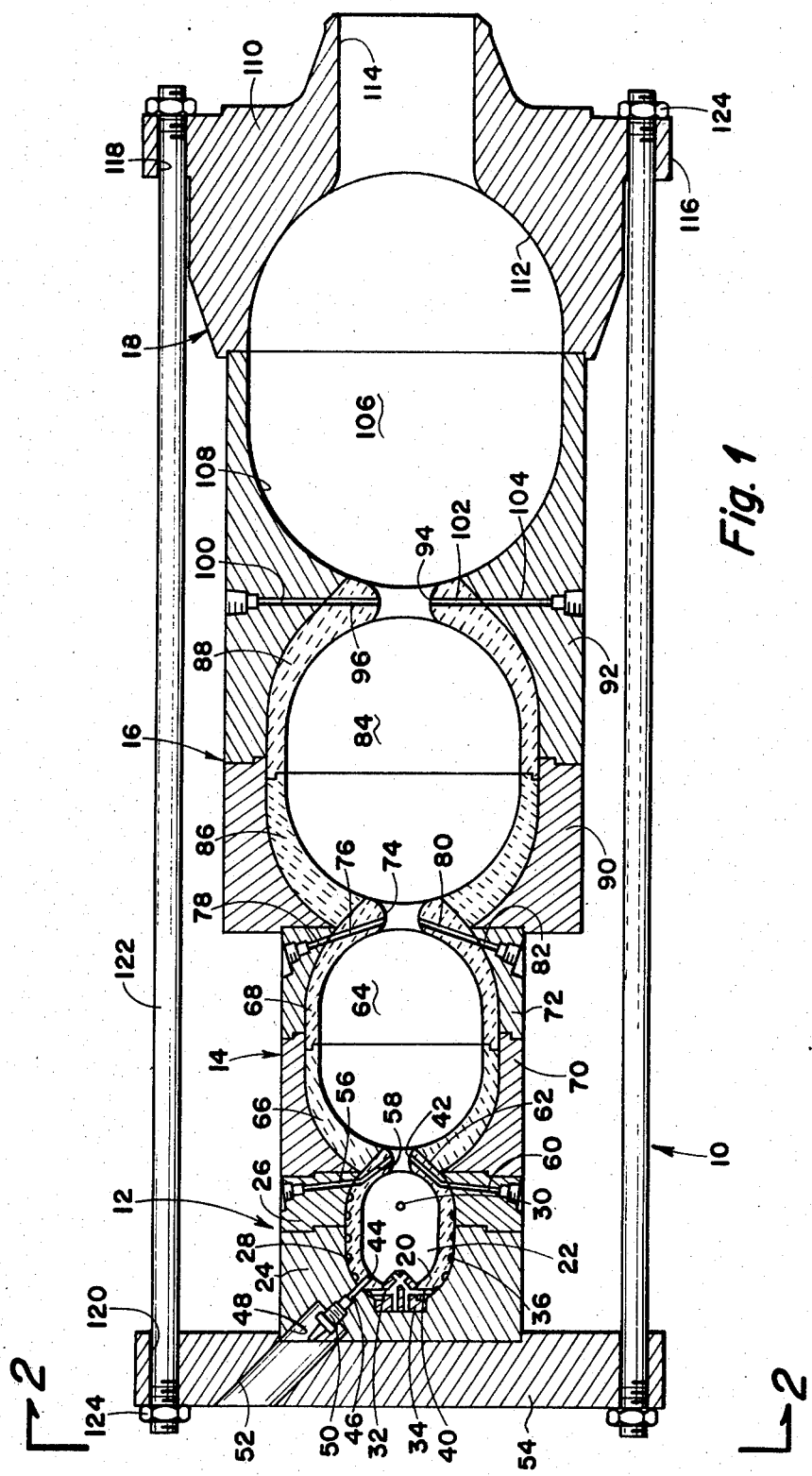
FIG. 1 is a sectional elevational view of a gas or steam generator embodying the invention.
Figure 2:
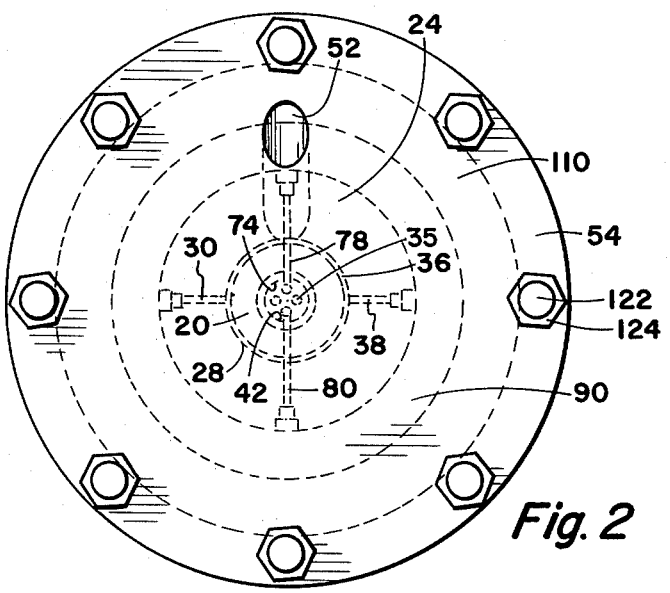
FIG. 2 is a view taken on line 2—2 of FIG. 1.

Referring to the drawings in detail, reference character 10 generally indicates a gas or steam generator apparatus comprising a plurality of interconnected combustion chamber assemblies 12, 14, 16, and 18. It is to be noted that, whereas four combustion chamber assemblies are shown in FIG. 1, substantially any desired number of the chamber assemblies may be utilized as will be hereinafter set forth. The chamber assembly 12 comprises a jacket 20, preferably constructed from a suitable thermal insulating material, such as ceramic or the like, and having a combustion chamber 22 provided therein. A sectional housing 24–26 surrounds the jacket 20 and is preferably constructed from a suitable metallic material, but not limited thereto. A first helical groove 28 is provided around the outer periphery of the jacket 20 and has one end in communication with a passageway or bore 30 extending radially through the housing section 26, and the opposite end in communication with an internal passageway 32 and a suitable mixer valve 34. The valve 34 extends through the jacket 20 and is in open communication with the chamber 22. A second helical groove 36 is provided around the outer periphery of the jacket 20 and has one end in communication with a passageway or bore 38 (FIG. 2) extending radially through the housing section 26, and preferably in diametrically opposed relation to the bore 30. The opposite end of the groove 36 is in communication with a second internal passageway 40 of the mixer valve 34. Both the bores 30 and 38 are open to the exterior of the housing section 26 for a purpose as will be hereinafter set forth.

The mixer valve 34 is disposed at one end of the chamber 22 and the opposite end of the chamber 22 is open through a restriction or restrictive orifice 42, which restricts the discharge of fluid from the chamber 22 and thus creates a considerably high pressure and temperature in the chamber during operation of the device 10. A bore 44 extends through the sidewall of the jacket 20 to provide communication between the chamber 22 and a bore 46 provided in the housing section 24. The bore 46 is enlarged at 48 for receiving a suitable igniter 50, such as a spark plug or the like. The bore 48 is in substantial axial alignment with a bore 52 provided in an end plate 54 which bears against the outer end of the housing section 24 as particularly shown in FIG. 1, and for a purpose as will be hereinafter set forth. The bore 52 provides access to the igniter 50 for facilitating installation thereof, removal thereof, or the like, as is well known.

A first passageway 56 extends through the housing section 26 into communication with a bore 58 provided in the sidewall of the jacket 20 and terminating at the orifice 42. A second passageway 60 similar to the passageway 56 and diametrically opposite with respect thereto extends through the housing section 26 into communication with a bore 62 provided in the jacket 20 and terminating in the orifice 42 opposite disposed with respect to the bore 58. The passageways 56 and 60 are both open to the exterior of the housing section 26 as particularly seen in FIG. 1. The orifice 42 is open to a second combustion chamber 64 which is provided in the assembly 14.

The assembly 14 comprises a sectional insulating jacket 66–68 surrounding the combustion chamber 64 and encased in a sectional housing 70–72 secured in end-to-end abutting relation with the housing 24–26 in a manner as will be hereinafter set forth. As hereinbefore set forth, one end of the chamber 64 is in communication with the chamber 22 through the orifice 42, and the opposite end thereof is provided with a restrictive orifice 74, which restricts the discharge of fluid from the chamber 64 in order to create a considerable pressure within the chamber 64 during operation of the apparatus 10. A first bore 76 extends through the sidewall of the jacket section 68 for providing communication between the orifice 74 and a passageway 78 provided in the housing section 72. A second bore 80 extends through the sidewall of the jacket section 68 in substantially diametrically opposed relation to the bore 76, and provides a communication between the orifice 74 and a passageway 82 provided in the housing section 72. The passageways 78 and 82 are both open to the exterior of the housing section 72 for a purpose as will be hereinafter set forth. As will be more particularly seen in FIG. 1, it is preferable that the volume or cross-sectional area of the combustion chamber 64 be greater than the volume or cross-sectional area of the combustion chamber 22.

The orifice 74 is open to a third combustion chamber 84 which is provided in the assembly 16. A sectional insulating jacket 86–88 surrounds the chamber 84 and is encased in a sectional housing 90–92 which is secured in end-to-end abutting relation with the housings 24–26 and 70–72 as will be hereinafter set forth. It is preferable that the volume or cross-sectional area of the chamber 84 be greater than the volume or cross-sectional area of the chamber 64. Whereas one end of the chamber 84 is open at the orifice 74, the opposite end is also provided with a restriction or orifice 94 which restricts the discharge of fluid from the chamber 84 in order to build up pressure within the chamber 84 during operation of the apparatus 10. A first substantially radially extending bore 96 is provided in the sidewall of the jacket section 88 and extends from the orifice 94 into communication with a passageway 100 provided in the housing section 88. A second bore 102 extends substantially radially through the sidewall of the jacket section 88 and is preferably diametrically opposed with respect to the bore 96, but not limited thereto. The bore 102 extends from the orifice 94 into communication with a passageway 104 provided in the housing section 88. The passageways 100 and 104 are open to the exterior of the housing section 88, and the orifice 94 is open to a chamber 106.

Generally speaking, the temperature within the chamber 106 is not as great as the temperature generated within the chambers 22, 64, and 84, and, as a result, it is considered that the use of an insulating jacket is not required around the chamber 106. As a result, the housing section 92 is preferably axially extended and is provided with a recess 108 therein, which forms a portion of the inner periphery of the chamber 106. The outer end of the recess 108 is open, and a flanged sleeve 110 is disposed against the outer end of the housing 92 and is provided with a recess 112 therein of a size generally complementary to the size of the recess 108 and cooperates therewith to form the remaining portion of the inner periphery of the chamber 106. A centrally disposed discharge port 114 is provided in the sleeve 110 which communicates between the chamber 106 and the exterior of the sleeve 110 for a purpose as will be hereinafter set forth. The sleeve 10 and outer portion of the housing section 88 cooperate to form the assembly 18.

The sleeve 110 is preferably provided with an outwardly extending circumferential flange 116 extending around the outer periphery thereof. The outer diameter of the flange 116 is preferably substantially the same as the outer diameter of the plate 54, and the flange 116 is provided with a plurality of circumferentially spaced apertures 118 disposed in substantial axial alignment with a plurality of circumferentially spaced bores 120 provided in the end plate 54. A rod member 122 extends through and between each of the associated pairs of aligned bores 118 and 120 and is secured therein by means of suitable nuts 124, which may be securely tightened whereby the sleeve 110 is constantly urged in a direction toward the end plate 54, thus securely retaining the housing sections 24–26, 70–72, and 90–92 in end-to-end abutting relationship. Of course, it will be apparent that any other suitable means of securing the housings together may be utilized, and it may be preferable to provide suitable sealing means between the housing.

Figures 3, 4:
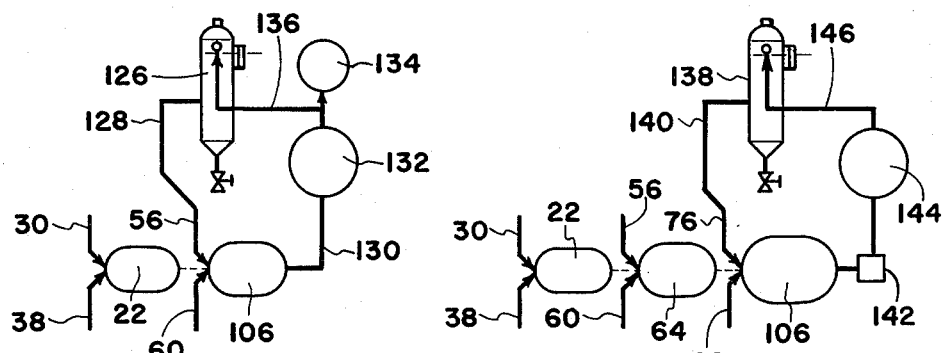
FIG. 3 is a schematic diagram of a power generator system embodying the invention.
FIG. 4 is a view similar to FIG. 3 illustrating a modified power generator system embodying the invention.
Figure 5:
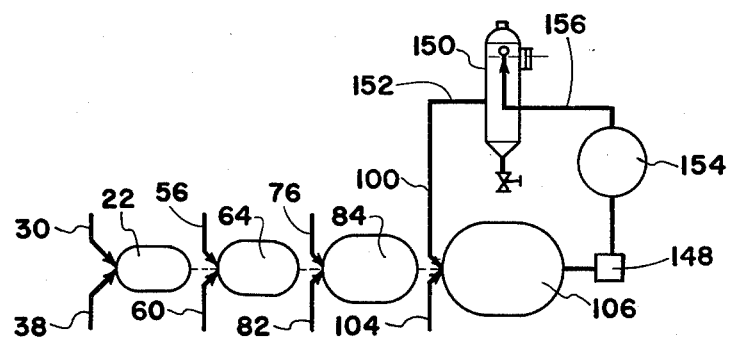
FIG. 5 is a view similar to FIGS. 3 and 4 illustrating still another power generator system embodying the invention and particularly for burning hard to ignite fuels.

Referring now to FIGS. 3, 4 and 5, schematic arrangement for a plurality of uses of the device 10 are shown. FIG. 3 shows a system which may be efficiently utilized when burning fuels which are relatively readily ignitable with the usual spark plugs or standard igniters. These fuels are preferably oils, natural gas, artificial gases, alcohols, and the like. In this system, it is preferable that only two stages or two combustion chambers, such as the chamber 22 and the chamber 106, be utilized, with the chamber 22 being the first stage combustion chamber and the chamber 106 being the second stage combustion chamber. The igniter 50 is operably connected with a suitable source of power (not shown) in any well known manner (not shown) to provide an ignition or spark within the chamber 22 when required. The passageway 30 is operably connected with a source of air or oxygen (not shown) for directing an oxygen supply into the mixer valve 34 for discharge into the chamber 22, and the passageway 38 is suitably connected with a source of a suitable fuel, such as hereinafter set forth, and supplied the fuel to the mixer valve 34 for discharge into the chamber 22. The oxygen (or air) and fuel are delivered to the respective helical grooves 28 and 36 and are directed simultaneously to the interior of the mixing valve 34, and the valve 34 injects the fuel and oxygen simultaneously into the chamber 22 through a plurality of ports 35 (FIG. 2) at a great velocity, and the fuel and oxygen are efficiently mixed for ready ignition in the chamber 22 by the ignitor 50. The gases of the combustion within the chamber 22 will be forced through the restrictive orifice 42 to build up pressure in the chamber 22 in excess of the pressure of the end product in the outlet 114 shown in FIG. 1.

As hereinbefore set forth, stage two of the system shown in FIG. 3 is the combustion chamber 106, and is the saturated or superheating chamber area. It is preferable that the volume of the chamber 106 be approximately sixty percent larger than the volume of the chamber 22 of stage one. Inlets 56 and 60 represent the inlets for water or recycled steam which is metered through the orifice 42. The steam or water is heated or reheated to form usable saturated or superheated steam in the chamber 106 and outlet 114. The product present at the outlet 114 is a combination of gases and steam from the combustion chambers 22 and 106. The product or mixture moves from the outlet 114, through a conduit means 130, and to a steam turbine 132, or the like. The fluid stream then passes to a suitable cold water pump 136 to cool superheated steam down to saturated steam which then travels through conduit means 136 for return to the reservoir 126. Passage of the fluid stream from the reservoir 126, through a conduit means 128, and the inlet means 56 completes the recycling of saturated steam.

Referring to FIG. 4, a modification of the invention is shown which may utilized in the handling of materials which are not readily ignitable by spark plugs, and the like. For example as is well known, liquified coals with water or oil are substantially impossible to ignite. In this embodiment or system, only three stages may be necessary, with stage one being the combustion chamber 22, which functions in the same manner as hereinbefore set forth in connection with the system shown in FIG. 3. The chamber 62 shown in FIG. 1 is the second stage, and the chamber 106 shown in FIG. 1 is the third stage for the system shown in FIG. 4. The hot products of the combustion in the chamber 22 emitting from the orifice 42 become the ignitor for the combustion chamber 64. In this system, the passageway or inlet 60 is in communication with the fuel, such as liquified coal, and the liquified coal is pumped through the inlet 60 and metered into the orifice 42. The inlet 56 is in communication with a source of oxygen or air and the compressed air is metered into the restrictive orifice 42. The air and liquified coal are ignited by the heat from the chamber 22 and the combustion thereof takes place in the chamber 64. The gases of the combustion in the chamber 64 pass through the restrictive orifice 74 and into the combustion chamber 106 (third stage). The chamber 106 is the heating chamber for water or saturated steam or superheated high pressure, high temperature dry steam. Inlet 76 is in communication with a recycle fluid reservoir 138 through conduit means 140 and the inlet 82 is also in communication with a source of water or saturated steam or superheated steam and the water or saturated steam or superheated steam is metered into the restrictive orifice 74 and heated to saturated steam or superheated steam. Gases from the combustion chambers 22 and 64 will heat the water or saturated steam or superheated high pressure, or dry high temperature steam and gases within the chamber 106. The steam and gases are released through the orifice 114 and pass through a suitable solid waste trap means 142 wherein solid particles are removed from the fluid stream. The gases and steam then move to a turbine 144, or the like, and return to the recycle reservoir 138 through conduit means 146 whereby the saturated steam may be recycled through conduit means 140 to passageway 76.

FIG. 5 illustrates a modification of the invention which may be utilized in the burning of materials which create great heat but are difficult to ignite, such as magnesium, aluminum, boron, borox, or the like. In this system, all four stages or combustion chambers 22, 64, 84 and 106 are preferably utilized, with the chamber 22 being the first stage, chamber 64 being the second stage, chamber 84 being the third stage, and chamber 106 being the fourth stage. The chamber 22 is utilized in substantially the same manner as hereinbefore set forth. The burned gases in the chamber 22 being forced through the restrictive orifice 42 create a build up of pressure which exceeds the pressure at the orifice 114. In the second stage chamber 64, the inlet 60 is in communication with a supply of water liquified magnesium, or the like, which is pumped and metered into the restrictive orifice 42, and the inlet 56 is in communication with a source of water which is also pumped and metered into the orifice 42. Heat from the combustion chamber 22 will ignite the magnesium to burn with the oxygen. The magnesium will then burn all of the oxygen from the steam, leaving hydrogen to be burned in the third stage chamber 84. The burning ratio of magnesium is: $H_2O—MgO_2=4$ parts of hydrogen to one part of magnesium.

The combustion gases from stages one and two will be forced through the restrictive orifice 74 into the third stage chamber 84, including the hydrogen which did not burn in the combustion chamber 64. Compressed air (or oxygen) is metered through the inlets 76 and 82 and through the orifice 74 and is forced into the chamber 84 by the superhot gases, thus igniting and burning the hydrogen in the chamber 84. The fourth stage chamber 106 is again the heating chamber to heat the water or saturated steam or superheated steam and is used in the same manner as in the systems of FIGS. 3 and 4. Water is pumped and metered through the inlets 100 and 104 into the restrictive orifice 94 and heated or reheated to saturated steam or superheated steam, and is forced through restrictive orifice 114. Gas and steam will be forced through a solid waste trap 148 as a source of energy that can be used to drive a steam turbine 154, or the like. The steam will be recycled from the turbine 154 through line 156 to a suitable recycle reservoir 150 and back through a conduit means 152 to the inlets 100 and 104, thus completing the recycle operation.

This use of magnesium as an energy source is particularly important when it is considered that magnesium is the most plentiful resource for fuel on this planet, but has never before been utilized to produce steam for a power source. Thus, not only is a previously untapped source utilized, but also the system of the invention is substantially pollution free and is economically feasible in construction and operation.

From the foregoing it will be apparent that the present invention provides a novel gas and steam generator wherein gases and steam are utilized in combination to provide a power source for a work operation. The apparatus comprises a multi-stage combustion chamber assembly wherein fuels of relatively ready ignition or fuels of difficult ignition may be utilized for an efficient creation of power for a work operation. Water is added to the fuels to to provide oxygen for combustion of the fuel to produce the steam and the steam is combined with the gases of combustion of the fuels in a manner that greatly conserves the quantity of fuel necessary for the power output.

Whereas the present invention has been described in particular relation to the drawings attached hereto, it should be understood that other and further modifications, apart from those shown or suggested herein, may be made within the spirit and scope of this invention.

What is claimed is:

1. A method for generating high pressure fluid for a work operation and comprising providing a plurality of combustion stages in open communication with one another, initially introducing an oxygen source and a fuel source into a first combustion stage, igniting the fuel-oxygen mixture in the first combustion stage, creating an upstream pressure within the first combustion stage in excess of the pressure released into another succeeding combustion stage, admitting a water bearing fluid into the said another succeeding combustion stage for producing steam in the said another succeeding combustion stage, discharging usable energy from the said another succeeding combustion stage for use in the work operation, and recycling condensed water bearing fluid for injection into the said another succeeding combustion stage.

2. A method for generating high pressure fluid for a work operation as set forth in claim 1 and including injecting the products of combustion of the ignited fuel-oxygen mixture in said first combustion stage into a second combustion stage prior to admitting a water bearing fluid into the said another succeeding combustion stage, admitting a hard to ignite fuel into said second combustion stage for ignition thereof by said products of combustion from said first combustion stage, and injecting the products of combustion from said second combustion stage into said another succeeding combustion stage for facilitating the production of steam therein.

3. A method for generating high pressure fluid for a work operation as set forth in claim 1 and including injecting the products of combustion of the ignited fuel-oxygen mixture in said first combustion stage into a second combustion stage prior to admitting a water bearing fluid into the said another succeeding combustion stage, introducing a water bearing fluid and a hard to ignite fuel into said second combustion stage for ignition by the said products of combustion of said first combustion stage whereby substantially all of the oxygen is burned from the mixture, introducing the products of combustion of the said second combustion stage into a third combustion stage, injecting an oxygen bearing fluid into said third combustion stage for facilitating combustion of the products contained therein, and discharging the products of combustion of the third combustion stage into said another succeeding combustion stage for facilitating the production of steam therein.

4. A method for generating high pressure fluid for a work operation as set forth in claim 1 wherein the hard to ignite fuel is liquified coal.

5. A method for generating high pressure fluid for a work operation as set forth in claim 4 wherein the liquified coal is a coal-water slurry.

6. A method for generating high pressure fluid for a work operation as set forth in claim 4 wherein the liquified coal is an oil-coal slurry.

7. A method for generating high pressure fluid for a work operation as set forth in claim 1 wherein the hard to ignite fuel is magnesium.

8. Apparatus for generating high pressure fluid for a work operation and comprising at least first and second stage combustion chambers in open communication with one another, mixing valve means in communication with the first stage combustion chamber, passageway means in independent communications with a source of oxygen and a source of fuel for simultaneously directing the oxygen and fuel to the mixer valve for injecting a fuel-oxygen mixture into the first stage combustion chamber, ignition means in communication with the first stage combustion chamber for igniting the fuel-oxygen mixture therein, restriction port means interposed between the first and second stage combustion chambers to provide upstream pressure within the first stage combustion chamber in excess of the pressure released through the restriction port means into the second stage combustion chamber, inlet means open to the first stage combustion chamber in the proximity of the restrictive port means for admitting water bearing fluid into the downstream side of the first stage combustion chamber for mixing with the products of combustion of the ignited fuel-oxygen mixture as the products of combustion are released through the restrictive port means into the second stage combustion chamber, wherein steam is produced from the water bearing fluid and is heated to a super-heated stage, restrictive port means provided at the downstream end of the second stage combustion chamber for release of the super heated steam therefrom to provide useful energy.

9. Apparatus for generating high pressure fluid for a work operation as set forth in claim 8 and including recycling means for returning the steam to the inlet means subsequent to the use of the superheated steam in the work operation.

10. Apparatus for generating high pressure fluid for a work operation as set forth in claim 8 wherein the volume of the second stage combustion chamber is greater than the volume of the first stage combustion chamber.

11. Apparatus for generating high pressure fluid for a work operation as set forth in claim 10 wherein the volume of the second stage combustion chamber is approximately sixty percent larger than the volume of the first stage combustion chamber.

12. Apparatus for generating high pressure fluid for a work operation as set forth in claim 8 and including metering means in communication with the inlet means for metering the flow of steam thereto.

13. Apparatus for generating high pressure fluid for a work operation and comprising a plurality of combustion chamber assemblies secured in end-to-end relation and having at least two interconnected combustion chambers provided therein, each of said combustion chambers being provided with a restrictive orifice at the outlet end thereof whereby high pressure and high temperature conditions are created in the upstream portion of the respective combustion chamber, mixer valve means provided in one of said combustion chamber assemblies and in open communication with the respective combustion chamber, first passageway means provided in the said one combustion chamber assembly in independent communication with an oxygen containing fluid and a fuel containing fluid for simultaneously directing the fluids to the mixer valve for discharge into the said respective combustion chamber, ignitor means provided in said one combustion chamber assembly and in an operable communication with the said respective combustion chamber for igniting the fuel-oxygen mixture therein, second passageway means provided in said one combustion chamber assembly providing communication between the exterior thereof and the proximity of the restrictive orifice of said respective combustion chamber for simultaneously admitting water bearing fluid and a second fuel product into the products of combustion moving through the restrictive orifice of the said respective combustion chamber whereby the second fuel product and components of the water bearing fluid are ignited for burning and passed into the respective combustion chamber of the next succeeding combustion chamber assembly, the restrictive orifice of the last mentioned combustion chamber providing a discharge port for the high pressure fluids from the apparatus to provide energy for use in the work operation.

14. Apparatus for generating high pressure fluid as set forth in claim 13, wherein the first passageway means comprises helical passageway means provided in the said one combustion chamber assembly and in communication with the mixer valve means, radially extending passageway means provided in the said one combustion chamber assembly providing communication between the exterior of the apparatus the and helical passageway means whereby said oxygen containing fluid and said fuel containing fluid may be directed to the mixer valve means.

15. Apparatus for generating high pressure fluid as set forth in claim 14 wherein the helical passageway means comprises two separate helical passageways, and the radially extending passageway means comprises a pair of independent oppositely disposed passageways, each of said radially extending passageways being in independent communication with separate helical passageways whereby the oxygen containing fluid and fuel containing fluid are independently and simultaneously directed to the mixer valve means.

16. Apparatus for generating high pressure fluid as set forth in claim 13 wherein the second passageway means comprises a pair of oppositely disposed substantially radially extending passageways provided in the said one combustion chamber assembly whereby said steam and second fuel product are independently delivered into the proximity of the restrictive orifice of the respective combustion chamber.

17. Apparatus for generating high pressure fluid as set forth in claim 13 and including a plurality of additional interconnected combustion chambers provided therein, each of said additional combustion chambers being provided with restrictive orifices at the outlet end thereof for creating high pressure and temperatures in the respective upstream combustion chamber, and each of said additional combustion chambers being provided with passageway means for admitting steam and an additional fuel product into the proximity of the respective orifice for burning of the additional fuel products and components of the steam for producing high pressure fluid with a minimum of waste product.

18. Apparatus for generating high pressure fluid as set forth in claim 13 wherein insulating jacket means is provided around selected combustion chambers for increasing the operating efficiency of the apparatus.

* * * * *